United States Patent
Boutros et al.

(10) Patent No.: US 11,184,276 B1
(45) Date of Patent: Nov. 23, 2021

(54) EVPN SIGNALING USING SEGMENT ROUTING

(71) Applicant: Ciena Corporation, Hanover, MD (US)

(72) Inventors: Sami Boutros, Union City, CA (US); Himanshu Shah, Hopkinton, MA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/870,113

(22) Filed: May 8, 2020

(51) Int. Cl.
  *H04L 12/721* (2013.01)
  *H04L 12/723* (2013.01)

(52) U.S. Cl.
  CPC .............. *H04L 45/34* (2013.01); *H04L 45/50* (2013.01); *H04L 45/66* (2013.01)

(58) Field of Classification Search
  CPC . H04L 12/4641; H04L 12/4662; H04L 45/08; H04L 45/44; H04L 45/50; H04L 45/66; H04L 45/74; H04L 49/351; H04L 61/6022; H04L 63/0272; H04L 63/0876
  See application file for complete search history.

(56) References Cited

U.S. PATENT DOCUMENTS

| 8,295,278 | B2 | 10/2012 | Shah et al. |
| 8,948,055 | B2 | 2/2015 | Bragg |
| 8,953,590 | B1 * | 2/2015 | Aggarwal ............... H04L 45/74 370/389 |
| 9,531,627 | B1 | 12/2016 | Alvarez et al. |
| 9,538,423 | B2 | 1/2017 | Alvarez et al. |
| 9,979,629 | B2 | 5/2018 | Sivabalan et al. |
| 10,069,639 | B2 | 9/2018 | Bragg et al. |
| 10,153,948 | B2 | 12/2018 | Ong |
| 10,250,494 | B2 | 4/2019 | Sivabalan et al. |
| 10,291,532 | B1 * | 5/2019 | Tiruveedhula ........ H04L 47/125 |
| 2009/0144403 | A1 * | 6/2009 | Sajassi ................ H04L 12/4633 709/223 |
| 2015/0288602 | A1 | 10/2015 | Bragg et al. |
| 2016/0119156 | A1 * | 4/2016 | Drake ..................... H04L 45/16 709/223 |

(Continued)

OTHER PUBLICATIONS

C. Filsfils et al., Spring Internet-Draft, Standards Track, Expires: Aug. 28, 2020, Network Programming extension: SRv6 uSID instruction draft-filsfils-spring-net-pgm-extension-srv6-usid-04, Feb. 25, 2020, pp. 1-14.

(Continued)

*Primary Examiner* — Kan Yuen
(74) *Attorney, Agent, or Firm* — Clements Bernard Baratta; Lawrence A. Baratta, Jr.; Christopher L. Bernard

(57) ABSTRACT

A node in a Segment Routing network includes a plurality of ports and a switching fabric between the plurality of ports, wherein, for an Ethernet Virtual Private Network (EVPN)-Virtual Private Local Area Network Service (VPLS), a port is configured to transmit a packet with a plurality of Segment Identifiers (SID) including a destination SID that identifies a destination node of the packet, a service SID that identifies an EVPN Instance (EVI), and a source SID that identifies one of the node and an Ethernet Segment (ES) that includes the node. The port can be further configured to receive a second packet with a second plurality of SIDs, and learn a Media Access Control (MAC) address based on a second service SID and a second source SID, of the second packet.

15 Claims, 11 Drawing Sheets

(56) References Cited

U.S. PATENT DOCUMENTS

| | | | |
|---|---|---|---|
| 2016/0380886 A1 | 12/2016 | Blair et al. | |
| 2017/0099180 A1* | 4/2017 | Singh | H04L 12/413 |
| 2017/0288948 A1* | 10/2017 | Singh | H04L 45/50 |
| 2018/0034648 A1* | 2/2018 | Nagarajan | H04L 69/325 |
| 2018/0167315 A1* | 6/2018 | Kanjariya | H04L 45/02 |
| 2018/0287946 A1* | 10/2018 | Nagarajan | G06F 9/542 |
| 2018/0324090 A1 | 11/2018 | Duncan et al. | |
| 2018/0375968 A1 | 12/2018 | Bashandy et al. | |
| 2019/0132221 A1 | 5/2019 | Boutros et al. | |
| 2019/0245787 A1 | 8/2019 | Skalecki et al. | |
| 2019/0356599 A1* | 11/2019 | Brissette | H04L 12/4675 |
| 2020/0128469 A1* | 4/2020 | Akhavain Mohammadi | H04L 45/50 |

OTHER PUBLICATIONS

C. Filsfils et al.. Spring Internet-Draft, Standards Track, Expires: Aug. 26, 2020, SRv6 Network Programming draft-ietf-spring-srv6-network-programming-10, Feb. 23, 2020, pp. 1-38.
A. Sajassi et al., Internet Engineering Task Force (IETF), Category: Informational, ISSN: 2070-1721, Requirements tor Ethernet VPN (EVPN), May 2014, pp. 1-15.
A. Sajassi et al., Internet Engineering Task Force (IETF), Category: Standards Track, ISSN: 2070-1721, A Network Virtualization Overlay Solution Using Ethernet VPN (EVPN), Mar. 2018, pp. 1-33.
J. Rabadan et al., Internet Engineering Task Force (IETF), Category: Standards Track, ISSN: 2070-1721, Framework tor Ethernet VPN Designated Forwarder Election Extensibility, Apr. 2019, pp. 1-32.
Aug. 19, 2021, International Search Report and Written Opinion for International Patent Application No. PCT/US2021/031283.

* cited by examiner

EVPN SIGNALING USING SEGMENT ROUTING

FIELD OF THE DISCLOSURE

The present disclosure generally relates to networking. More particularly, the present disclosure relates to systems and methods for Ethernet Virtual Private Network (EVPN) signaling using Segment Routing.

BACKGROUND OF THE DISCLOSURE

EVPN technology is replacing the legacy Pseudowire (PW) technology for Layer 2 (L2)-Virtual Private LAN (Local Area Network) Service (VPLS) and Virtual Private Wire Service (VPWS). EVPN is described, e.g., in RFC 7209, "Requirements for Ethernet VPN (EVPN)," May 2014, RFC 7432, "BGP MPLS-Based Ethernet VPN," February 2015, and RFC 8365, "A Network Virtualization Overlay Solution Using Ethernet VPN (EVPN)," March 2018, the contents of each are incorporated by reference. EVPN uses Border Gateway Protocol (BGP) signaling to establish the EVPN instance (EVI) with BGP Peers to offer a multipoint-to-multipoint L2 Ethernet service for a given client. EVPN relies on learning the Internet Protocol (IP) and Media Access Control (MAC) address binding of the locally connected Customer Edges (CEs) and distributing this information in the BGP EVPN Protocol Data Units (PDUs) to remote Provider Edges (PEs) that are members of the established EVPN instance. That is, conventionally, EVPN utilizes BGP for control plane-based learning. In particular, BGP utilizes an EVPN Network Layer Reachability Information (NLRI), which includes a Route Type field that details the encoding of the EVPN NLRI. The Route Types include 1—Ethernet Auto-Discovery (A-D) route, 2—MAC/IP Advertisement route, 3—Inclusive Multicast Ethernet Tag route, and 4—Ethernet Segment route.

While there are benefits to maintain control on what MAC addresses are advertised and processed by the EVPN instance members, the tradeoffs are a longer learning period, scalability concerns (EVI members learn all MAC addresses irrespective of their interest in holding only the MAC addresses their site is interested in communicating with), the reaction is slow related to MAC address movement and network failures, and the like. That is, control plane MAC learning is much slower than the fast data plane MAC learning available on switching technology today and reacts a lot slower to MAC moves and network failures.

BRIEF SUMMARY OF THE DISCLOSURE

The present disclosure relates to systems and methods for Ethernet Virtual Private Network (EVPN) signaling using Segment Routing. Specifically, the present disclosure includes a simplification to the BGP overhead of the EVPN control plane, especially for MAC address distribution by leveraging data plane MAC address learning, using Segment Routing. The approach described herein maintains the benefits of EVPN, such as all-active redundancy, multi-pathing in the core, auto-provisioning, and auto-discovery. Specifically, the present disclosure utilizes Segment Routing techniques to enable EVPN VPLS services without the need for EVPN Route Types 1, 2, 3, and 4 in BGP. The present disclosure utilizes various Segment Identifiers (SID) to enable MAC learning via the data plane instead of the control plane, providing fast convergence and scale through conversational learning. The present disclosure further utilizes an anycast SID to maintain the benefit of Active/Active (A/A) multihoming and multipathing offered by EVPN. Also, the present disclosure maintains auto-discovery and single side provisioning of the service.

In an embodiment, a node in a Segment Routing network includes a plurality of ports and a switching fabric between the plurality of ports, wherein, for an Ethernet Virtual Private Network (EVPN)-Virtual Private Local Area Network Service (VPLS), a port is configured to transmit a packet with a plurality of Segment Identifiers (SID) including a destination SID that identifies a destination node for the packet, a service SID that identifies an EVPN Instance (EVI), and a source SID that identifies one of the node and an Ethernet Segment (ES) that includes the node. The port can be further configured to receive a second packet with a second plurality of SIDs, and learn a Media Access Control (MAC) address based on a second service SID and a second source SID, of the second packet. The node utilizes the second plurality of SIDs for data plane-based MAC learning in lieu of control plane learning. The service SID can be configured on every node in the Segment Routing network that are a member of the EVI. The service SID can be distributed via signaling in the Segment Routing network. The source SID can be an anycast SID when the node is in a multi-homed configuration in the ES along with one or more additional nodes of the Segment Routing network. The node and the one or more additional nodes in the Segment Routing network can utilize a designated forwarding election to determine which node forwards in the ES. The destination SID can be a multicast SID or a node broadcast SID for Broadcast, Unknown, and Multicast (BUM) traffic. The source SID can be located after the service SID for the destination node to learn a source Media Access Control (MAC) address associated with the node.

In another embodiment, a method includes, in a node in a Segment Routing network with the node including a plurality of ports and a switching fabric between the plurality of ports, and for an Ethernet Virtual Private Network (EVPN)-Virtual Private Local Area Network Service (VPLS); and transmitting, by a port, a packet with a plurality of Segment Identifiers (SID) including a destination SID that identifies a destination node for the packet, a service SID that identifies an EVPN Instance (EVI), and a source SID that identifies one of the node and an Ethernet Segment (ES) that includes the node. The method can further include receiving, by the port, a second packet with a second plurality of SIDS; and learning a Media Access Control (MAC) address based on a second service SID and a second source SID, of the second packet. The node utilizes the second plurality of SIDS for data plane-based MAC learning in lieu of control plane learning. The service SID can be configured on every node in the Segment Routing network that are a member of the EVI. The service SID can be distributed via signaling in the Segment Routing network. The source SID can be an anycast SID when the node is in a multi-homed configuration in the ES along with one or more additional nodes of the Segment Routing network. The destination SID can be a multicast SID or a node broadcast SID for Broadcast, Unknown, and Multicast (BUM) traffic. The source SID can be located after the service SID for the destination node to learn a source Media Access Control (MAC) address associated with the node.

In a further embodiment, an apparatus, in a node in a Segment Routing network, for implementing an Ethernet Virtual Private Network (EVPN)-Virtual Private Local Area Network Service (VPLS), includes circuitry configured to transmit a first packet with a plurality of Segment Identifiers (SID) including a destination SID that identifies a destination node for the packet, a service SID that identifies an EVPN Instance (EVI), and a source SID that identifies one of the node and an Ethernet Segment (ES) that includes the node, circuitry configured to receive a second packet with a second plurality of SIDS, and circuitry configured to learn a Media Access Control (MAC) address based on a second service SID and a second source SID, of the second packet. The second plurality of SIDs are used for data plane-based MAC learning in lieu of control plane learning. The source SID can be an anycast SID when the node is in a multi-homed configuration in the ES along with one or more additional nodes of the Segment Routing network.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
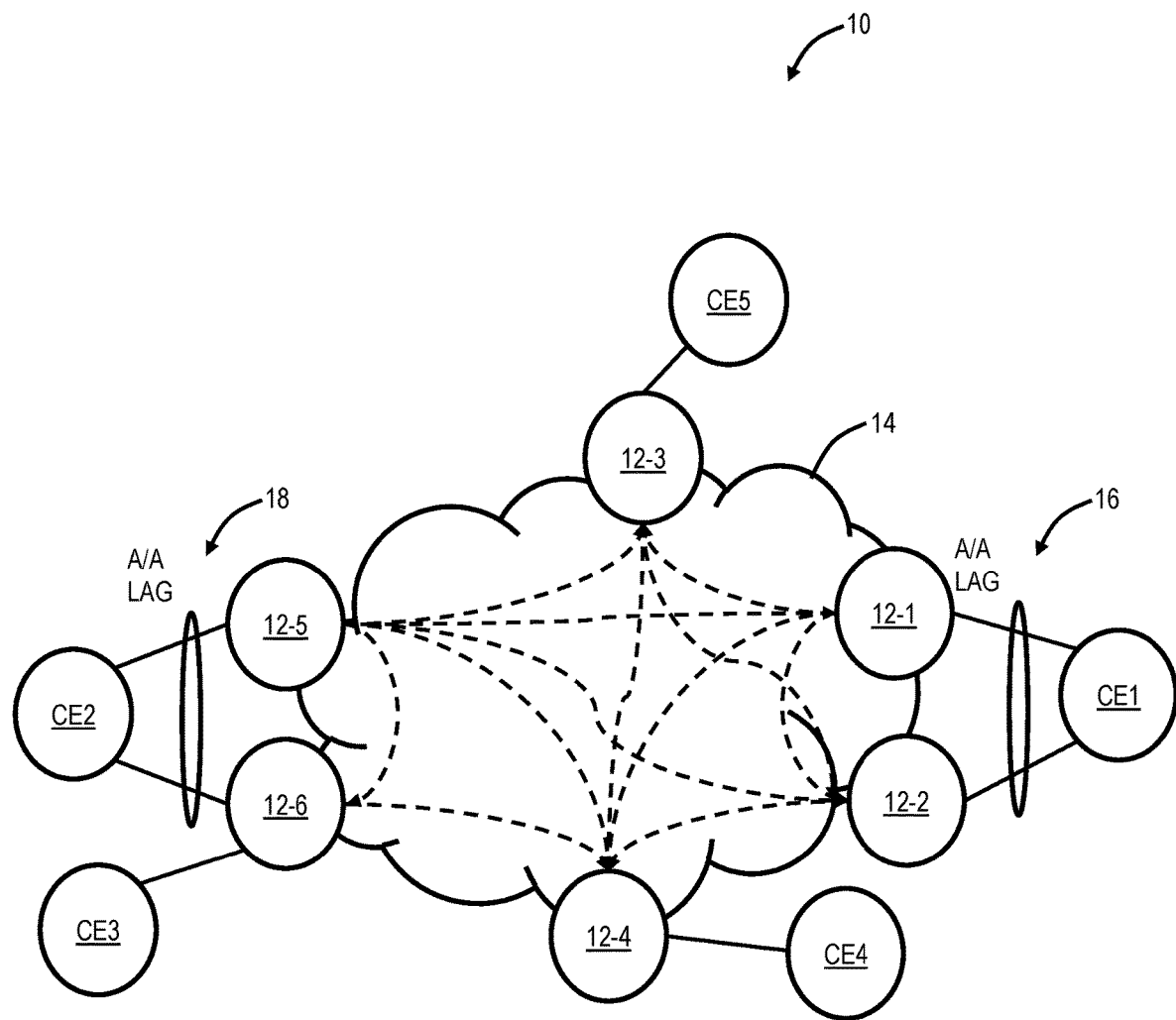
FIG. 1 is a network diagram of an example network including various nodes in a Segment Routing network as well as various Customer Edge (CE) nodes include two CE nodes in an Active/Active LAG configuration.

Again, the present disclosure relates to systems and methods for Ethernet Virtual Private Network (EVPN) signaling using Segment Routing. Specifically, the present disclosure includes a simplification to the BGP overhead of the EVPN control plane, especially for MAC address distribution by leveraging data plane MAC address learning, using Segment Routing. The approach described herein maintains the benefits of EVPN, such as multi-active redundancy, multi-pathing in the core, auto-provisioning, and auto-discovery. Specifically, the present disclosure utilizes Segment Routing techniques to enable EVPN VPLS services without the need for EVPN Route Types 1, 2, 3 and 4 in BGP. The present disclosure utilizes various Segment Identifiers (SID) to enable MAC learning via the data plane instead of the control plane, providing fast convergence and scale through conversational learning. The present disclosure further utilizes an anycast SID to maintain the benefit of Active/Active (A/A) multihoming and multipathing offered by EVPN. Also, the present disclosure maintains auto-discovery and single side provisioning of the service.

Acronyms

The following acronyms are utilized herein:

| | |
|---|---|
| A/A | Active/Active; used synonymously with all-active when a CE is multi-homed to two or more PEs |
| ARP | Address Resolution Protocol |
| BGP | Border Gateway Protocol |
| BUM | Broadcast, Unknown, and Multicast |
| CE | Customer Edge |
| DF | Designated Forwarder; DF algorithm is used on MH (PE) peers to elect DF for each VLAN |
| DMAC | Destination MAC |
| DP | Data Path |
| ECMP | Equal Cost Multi-Path |
| ES | Ethernet Segment; when a CE is MH to PEs via a LAG, MH (PE) peers identify LAG interface as Ethernet Segment |
| EVPN | Ethernet VPN |
| EVI | Ethernet VPN Instance |
| IGP | Interior Gateway Protocol |
| IP | Internet Protocol |
| LAG | Link Aggregation Group |
| MAC | Media Access Control |
| MH | Multi-home |
| mp2mp | Multipoint-to-Multipoint |
| MPLS | Multiprotocol Label Switching |
| PW | Pseudowire |
| RT | Route Target; EVPN uses BGP RTs with import/export policy to form EVI member group |
| SH | Split Horizon |
| SID | Segment Identifier |
| SMAC | Source MAC |
| VLAN | Virtual Local Area Network |
| VPLS | Virtual Private LAN Service |
| VPN | Virtual Private Network |
| VPWS | Virtual Private Wire Service |

Segment Routing Overview

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each segment is represented by a Segment Identifier (SID).

In SR-MPLS, all SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SR-MPLS, SRGB is a local property of a node and identifies the set of local labels reserved for global segments. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by ISIS or OSPF. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by an adjacency SID, which represents a specific adjacency, such as egress interface, to a neighboring router. The adjacency SID is distributed by ISIS or OSPF. The adjacency segment steers the traffic to a specific adjacency.

An anycast segment is a type of prefix segment that represents an anycast group. An anycast segment/SID is used for policies or protection. When forwarding traffic to an anycast a node processing the forwarding will pick a device from the anycast group, which is the closest. If the closest device from the anycast group goes away, traffic will automatically switch to the next closest device in the anycast group.

SR-MPLS utilizes MPLS labels for the SID, whereas SRv6 utilizes an IPv6 address for a SID, i.e., when an SRv6 SID is in the Destination Address field of an IPv6 header of a packet, it is routed through an IPv6 network as an IPv6 address. Note, various example embodiments described herein are presented with reference to SR-MPLS, but those skilled in the art will recognize SRv6 is also contemplated.

A multicast SID represents a multicast segment that denotes the replication of the received packet. The implied interpretation of the Ethernet frame with multicast SID is that the received frame is of type BUM.

A service SID represents an EVPN service instance. It is an absolute MPLS label value that uniquely identifies an EVPN instance and is configured on all the PEs that are member of that EVPN instance.

A broadcast service SID identifies the received packet on the service as BUM. It is an absolute MPLS label value and is configured on all the PEs that are member of that EVPN instance.

A broadcast node SID is advertised by a node that identifies the BUM Ethernet payload. The broadcast node SID is common for all the EVPN instances configured on that node. All the SR nodes, identifies and processes this SID, same as node SID. The broadcast node SID is interchangeably referred to as "destinatnion SID for BUM" or as "broadcast SID" in this document.

EVPN Utilizing SR

Figure 2:
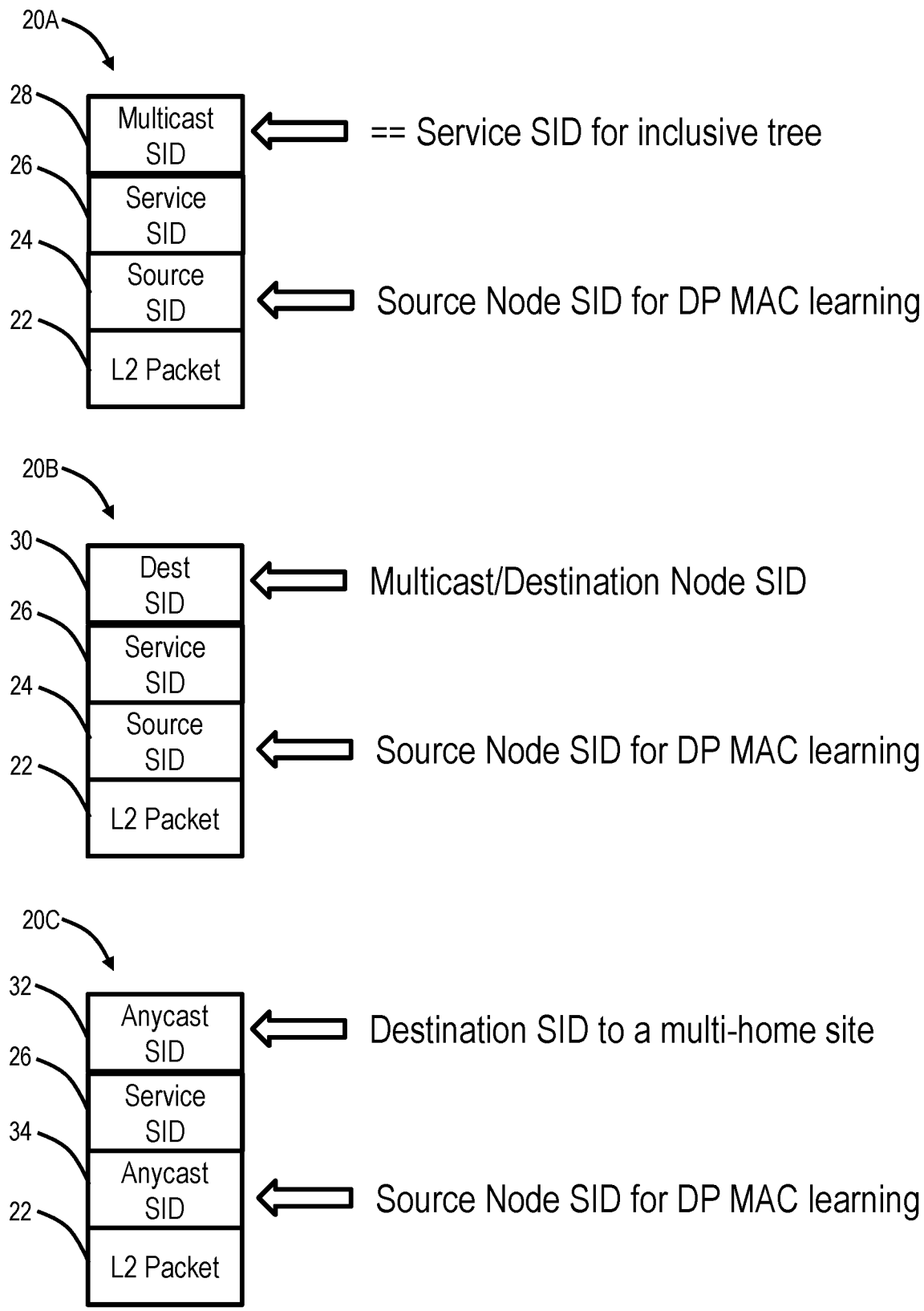
FIG. 2 is a block diagram of three example packets, with associated SIDs for illustrating the use of Segment Routing techniques to enable EVPN VPLS services without having to use the EVPN Route Types 1, 2, 3 and 4.

FIG. 1 is a network diagram of an example network 10 including various nodes 12 (labeled as nodes 12-1-12-6) in a Segment Routing network 14 as well as various Customer Edge (CE) nodes (labeled CE1-CE5) include two CE nodes CE1, CE2 in an Active/Active LAG 16, 18 configuration. FIG. 2 is a block diagram of example packets 20A, 20B, 20C, with associated SIDs for illustrating the use of Segment Routing techniques to enable EVPN VPLS services without having to use the EVPN Route Types 1, 2, 3 and 4. That is, PE nodes 12 are configured to use SIDs associated with Segment Routing for MAC learning (i.e., which source (CE) MAC address in the received L2 packet is associated with which PE node (Source SID)), instead of using the EVPN Route Types 1, 2, 3 and 4. The present disclosure utilizes various SIDs on a label stack on a Layer 2 (L2) packet 22 for an EVPN, including:

a first SID at the bottom of a label stack that is a source node SID 24 and is used for data plane MAC learning. The source node SID 24 can be a node SID or anycast SID. The source SID 24 is used by a remote node 12 for data plane MAC learning.

a service SID 26 that identifies the EVPN instance (EVI) and is configured on all the PEs nodes 12 that are members of the same EVI;

a multicast SID 28, that identifies the broadcast domain of the EVI is used when sending L2 packet with unknown unicast DMAC, Broadcast and Multicast DMAC;

a multicast SID 28, a destination SID 30, or an anycast SID 32 at the top of the label stack, The service SID 26 and the broadcast service SID are distributed within IGP/BGP to all PE nodes 12. Each member PE node 12 records the received service SIDs along with node SID 24 of the advertising PE nodes 12.

When a CE is multi-homed (MIT) to PE nodes 12 (identified by Ethernet Segment), each multi-homed PE also advertises the Anycast SID that represents the attached Ethernet Segment (ES). Instead of EVPN Route Type 4, the advertisement of anycast SID is used amongst MH PE peers to utilize the Designated Forwarder algorithm that elects forwarder for each VLAN present on the ES. This mechanism prevents looping and duplicates for BUM packets to MH CE.

The nodes 12 learn CE MAC addresses from the passing data frames, i.e., from connected CE at local PE: SMAC to Attachment Circuit, and from the L2 packet received over the tunnel at remote PE: SMAC to source SID or Anycast SID.

SR-EVPN-VPLS Service with Data Plane Mac Learning—Service Auto-Discovery, Building mp2mp Tree for Flooding In FIG. 1, again, there is no Route Type 1, 2, 3, 4 needed, and services are auto-discovered. The same EVPN service SID 26 is configured on all EVI members, i.e., the nodes 12-1-12-6, and this service SID 26 is distributed via IGP/BGP. Each PE node 12 discovers peer PE nodes 12 and what EVIs they are a member of. That is, the nodes 12-1-12-6 will flood to IGP/BGP control plane the service SIDs they are configured with. The flooding information can be used to discover what node 12 is configured with what service, as well, can help build an mp2mp flooding tree for L2. For BUM traffic, there are various options including 1) an EVPN with all PE nodes 12: inclusive mp2mp flooding tree using the multicast SID 28, 2) ingress replication to each EVI member PE node 12 using per PE node broadcast SID for BUM traffic distributed by the PE nodes 12 using IGP/BGP, and 3) service discovery can also be used to build multicast SR tunnel per EVI or for all EVIs using multicast SID as per option 1. For unknown unicast, the receiver does not know whether sender sent the packet as broadcast (ingress replication), so a non-DF receiver would send the packet to same CE causing duplicate packets. In this case, sender must either use a broadcast service SID or broadcast SID so the receiver can discriminate as such and only DF send the packet towards CE.

Figure 3:
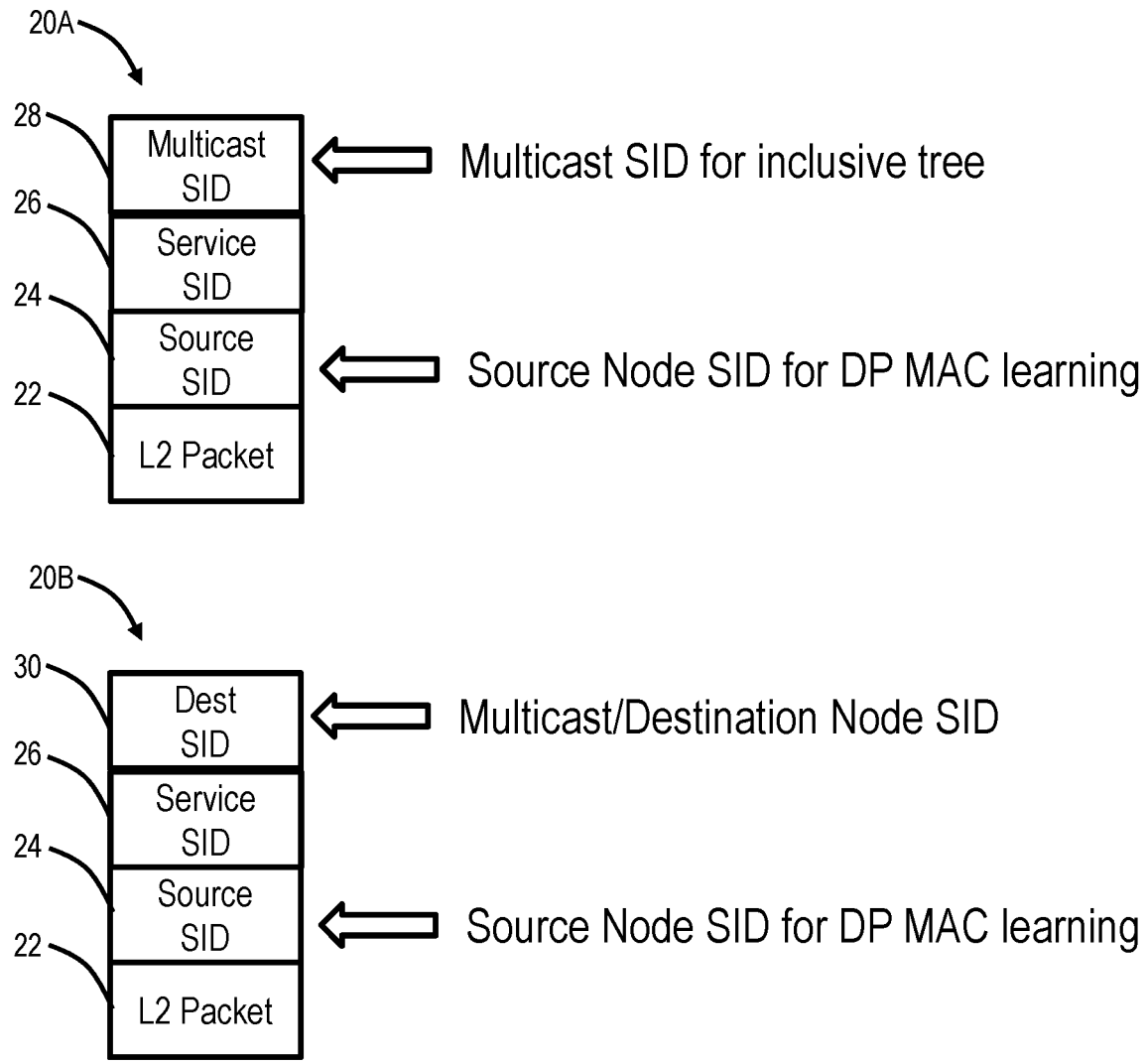
FIG. 3 is a block diagram of example packets for a broadcast and multicast frame sent by a single home PE node over Segment Routing.

FIG. 3 is a block diagram of example packets 20A, 20B for a broadcast, and a multicast frame sent by a single home PE node 12 over Segment Routing. The packet 20A includes the multicast SID 28 for an inclusive tree for BUM traffic. The packet 20B includes the destination SID 30 for BUM (i.e., broadcast SID) when the destination MAC is unknown unicast. The source SID 24 after the service SID 26 is necessary for the receiver to learn the source MAC address (from L2 packet) associated with sending PE (i.e., source SID). A broadcast SID is the "destination SID for BUM" is something that all IGP nodes will have to know and have a forwarding entry/SPF based.

Again, for BUM traffic, there are a few options. Ingress replication, and in order to support this case, each node 12 can advertise a broadcast service SID per EVPN instance in IGP or BGP similar to the service SID per EVPN instance for unicast traffic, or one common Broadcast SID per node 12 for all EVPN instances (that the node 12 is a member of), this will be treated like a node SID. Now the ingress node 12 when replicating BUM traffic will use this broadcast service SID instead of the service SID per EVPN instance when sending the packet to the egress nodes 12. So the stack of SIDs will be [Destination SID, Broadcast service SID, Source SID] for each replicated packet to a given destination (egress node 12). For a common broadcast SID, the stack will be [Broadcast node SID, Service SID, Source SID] for each replicated packet, notice that the Broadcast node SID is replacing the destination SID. Also, it is possible to use the Multicast SID, and in that case, the stack of SIDs will be [Multicast SID, Service SID, Source SID], notice that Multicast SID here is replacing the destination SID.

SR-EVPN-VPLS Service with Data Plane MAC Learning Example

Figure 4:
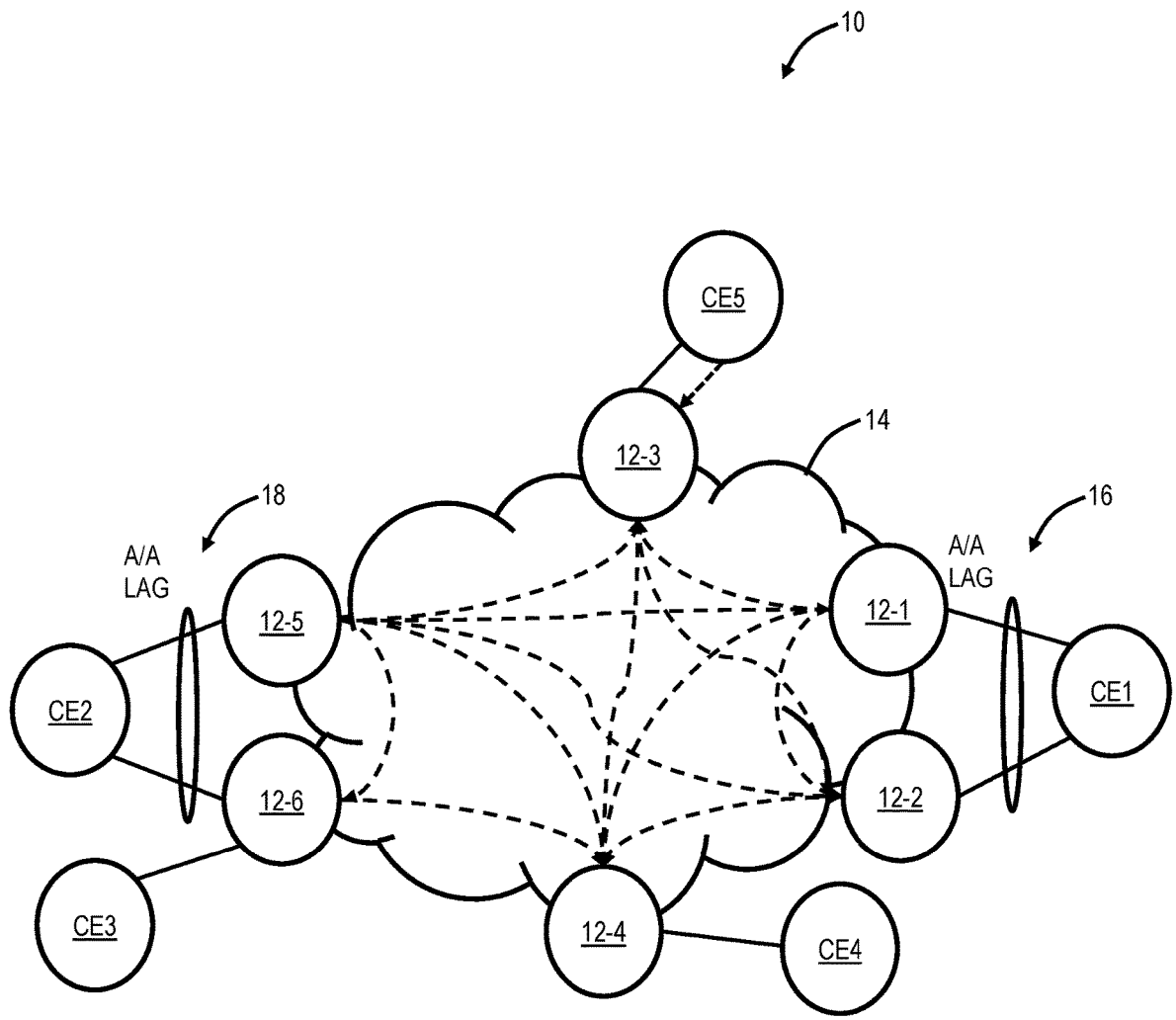
FIG. 4 is a network diagram of the network illustrating data plane MAC.

FIG. 4 is a network diagram of the network 10 illustrating data plane MAC. The CE MAC addresses are learned by nodes 12 through the data plane against the source node SID 24 that is encapsulated under the service SID 26. In this example of FIG. 4, the node 12-3 will learn the CE5 MAC address and flood this MAC address to all other nodes 12-1, 12-2, 12-4, 12-5, 12-6. The nodes 12-1, 12-2, 12-4, 12-5, 12-6 will learn the MAC address of the CE5 as reachable via the source node SID 24 owned by the node 12-3. In this example of FIG. 4, the node 12-3 will learn the CE5 MAC address via a L2 packet received from CE5 and if the DMAC in the L2 packet is unknown to the node 12-3, it will indirectly flood this CE5 MAC address to all other nodes 12-1, 12-2, 12-4, 12-5, 12-6 via ingress replication or with a multicast SID mechanism as described later. The nodes 12-1, 12-2, 12-4, 12-5, 12-6 will learn the MAC address of the CE5 as reachable via the source node SID 24 owned by the node 12-3.

Figure 5:
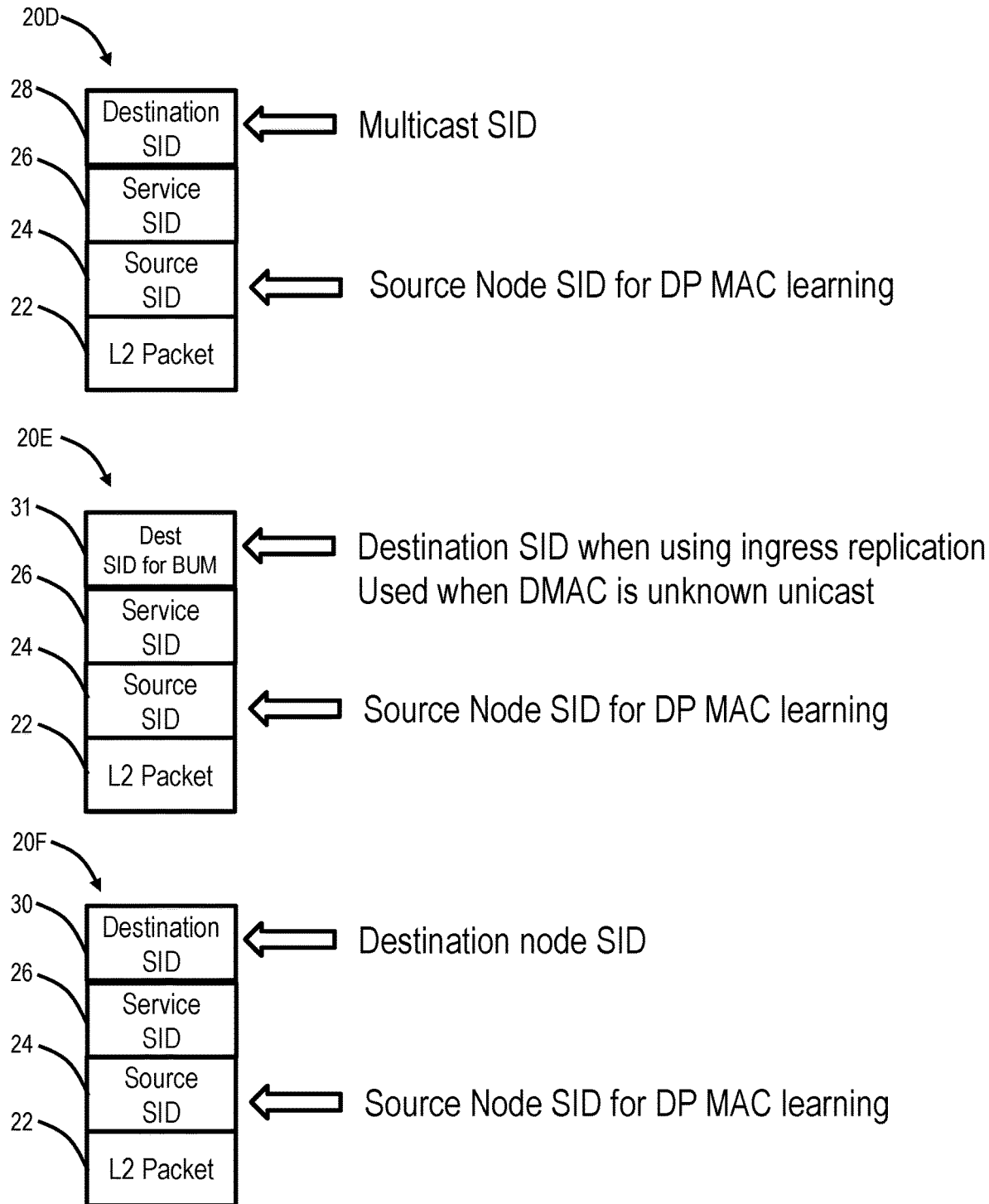
FIG. 5 is a block diagram of example packets for data plane MAC learning.

FIG. 5 is a block diagram of example packets 20D, 20E, 20F for data plane MAC learning. The topmost SID is either the multicast SID 28 if the DMAC is BUM and the Segment Routing multicast tree has been built, or, destination SID 30 for BUM when the DMAC is BUM and ingress replication is used, or, it is the destination SID 31 if the DMAC is known unicast with a learned association of the SID and MAC.

Figure 6:
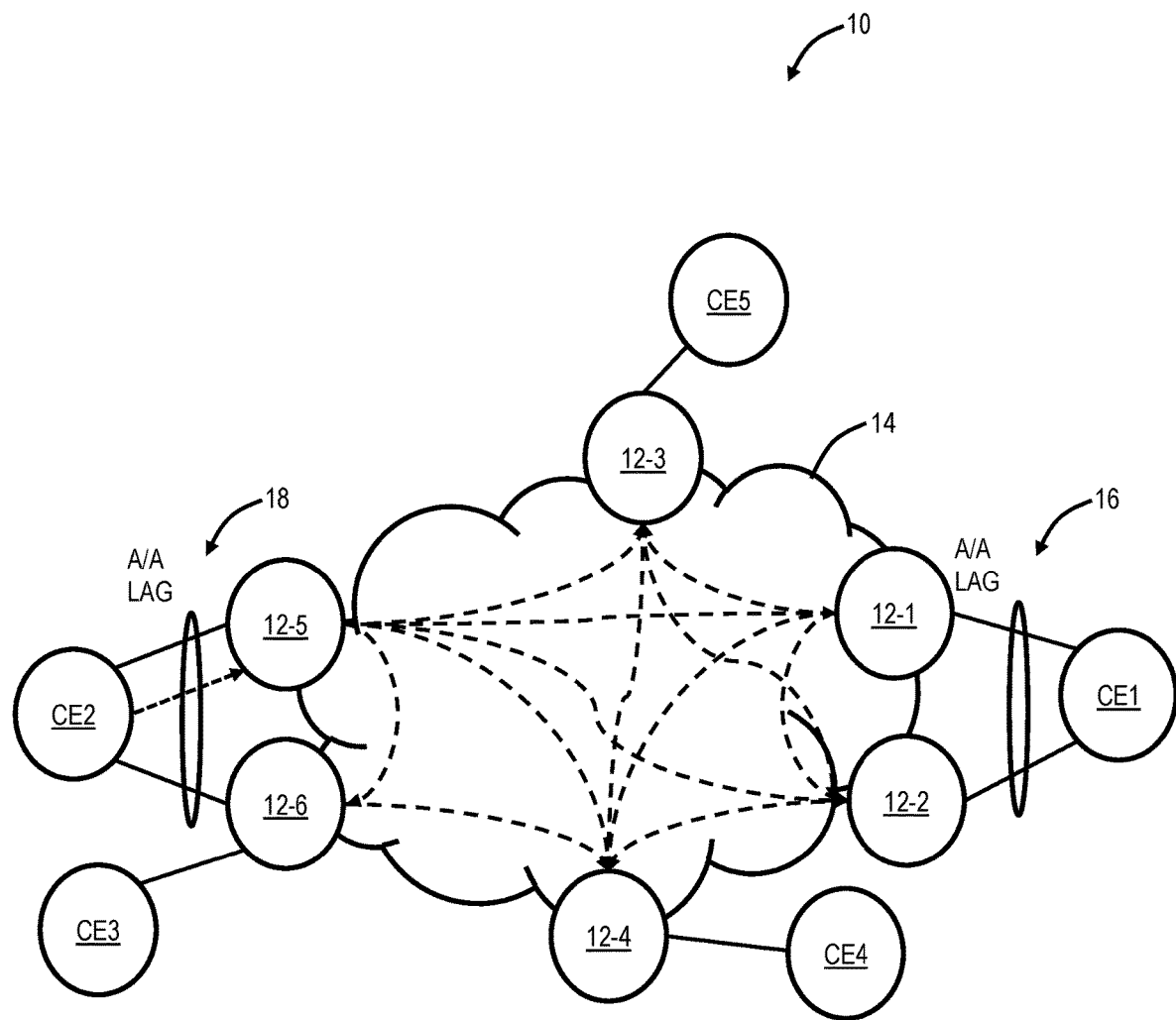
FIG. 6 is a network diagram of the network illustrating Multi-Homed (MH) Ethernet Segment (ES) with the anycast SID.

SR-EVPN-VPLS Service with Data Plane MAC Learning—Presenting Multi-Homed Ethernet Segment with Anycast SID FIG. 6 is a network diagram of the network 10 illustrating Multi-Homed (MH) Ethernet Segment (ES) with the anycast SID 32. In this example, the node CE1 is multi-homed connected to the PE nodes 12-1, 12-2, via A/A LAG 16 is sending packets to CE2 that is multi-homed and connected to the PE nodes 12-5, 12-6, via the A/A LAG 18. To achieve A/A MH, the present disclosure utilizes the anycast SID 32 on top of the label stack and an anycast SID 34 instead of the source SID 24 on the bottom of the label stack, as illustrated in the packet 20C in FIG. 2. The anycast SID 32, 34 per Ether Segment is flooded by IGP/BGP for reachability through the set of nodes 12-5, 12-6 connected to the Multi-Home (MH) site. Aliasing/Multi-pathing in EVPN are achieved using similar mechanisms used for an anycast SID in Segment Routing. Aliasing is where a node, such as the node 12-1 wants to forward a packet to the node CE2; it may send it to either the PE nodes 12-5, 12-6 even though it may have only learned of the node CE2 from the PE node 12-5. Similarly, multi-pathing is where that packet from the node 12-1 is forwarded to either of the PE nodes 12-5, 12-6.

The anycast SID 32, 34 in Segment Routing represents a group where any member of the group can process the received frame. The present disclosure uses the anycast SID 32, 34 to identify MH PE peers connected to the same ES to denote when a MAC address is learned from an ES and if a sender uses the anycast SID 32 as the destination SID, any one of the MH PE nodes 12-5, 12-6 can forward the frame to the locally connected CE2. In FIG. 6, node 12-3 will learn the CE2's MAC address via the any cast SID 32 even if the CE's MAC was only learned by the node 12-5. When the CE5 connected to the node 12-3 sends the frame to the CE2 connected to the nodes 12-5, 12-6, it uses the anycast SID 32 as the destination SID. Segment Routing will determine which node 12-5, 12-6 is more suitable (based on shorter distance or ECMP) and send the frame to either of the nodes 12-5, 12-6. Again, this is called Aliasing and Multi-pathing For MAC learning with the anycast SID 32, if DMAC is unknown, the node 12-5 floods the frame using either ingress replication or with a multicast SID. The node 12-5 receives a L2 packet from CE2 with a DMAC in the L2 packet unknown to the node 12-5. Every receiver (node 12), including the node 12-6, will record the association of SMAC with the source anycast SID 32. If the node 12-5 floods a packet to the node 12-6, the node 12-6 will not forward it to the CE2 associated with the anycast SID 32 given that the source anycast SID is owned by the node 12-6 as well. The node 12-5 will learn the CE2 MAC, and flood the MAC to all nodes 12 including the node 12-6, each node 12 will learn the CE2 MAC as reachable via the anycast SID 32 owned by the nodes 12-5, 12-6. The same learning is also applied when the DMAC is known to node 12-5 and sent to a specific destination node 12.

When the node 12-6 receives this frame, it recognizes based on the source anycast SID 32 that it is also connected to the same Ethernet Segment and hence will not forward the frame to the CE2 on that ES. That is, the node 12-6, will apply split-horizon and will not send the packet back to the MH CE2, but will program the CE2 MAC as reachable via the MH peer PE (node 12-5). On a link failure between the node 12-6 and CE2, the node 12-6 can send the received L2 packet from the Segment Routing network 14 to the node 12-5 or other nodes connected to the MH CE2, for fast convergence until it withdraws the anycast SID associated with the MH site. This is called Split Horizon and prevents duplication and looping of the frames.

Also, for fast convergence, if the link between the node 12-6 and the CE2 is broken, the node 12-6 will withdraw the anycast SID 32 in IGP flooding. In the meantime, the frames targeted to the node 12-6 destined for the CE2 connected to the ES, is forwarded to the node 12-5 by the node 12-6, incurring no service loss. There is no change on all the remote nodes 12-1, 12-2, 12-3, 12-4 because MAC addresses were learned based on the anycast SID 32 and the node 12-5 is still the member of that anycast SID 32, the frames destined to the anycast SID 32 will now arrive only at the node 12-5. There is no MAC withdrawal or flushing per se until all MH peers have withdrawn the anycast SID 32 (in FIG. 6, the nodes 12-5, 12-6). All the learned MAC addresses on the anycast SID 32 may be flushed when both the nodes 12-5, 12-6 withdraw the anycast SID 32 due to down links.

Figure 7:
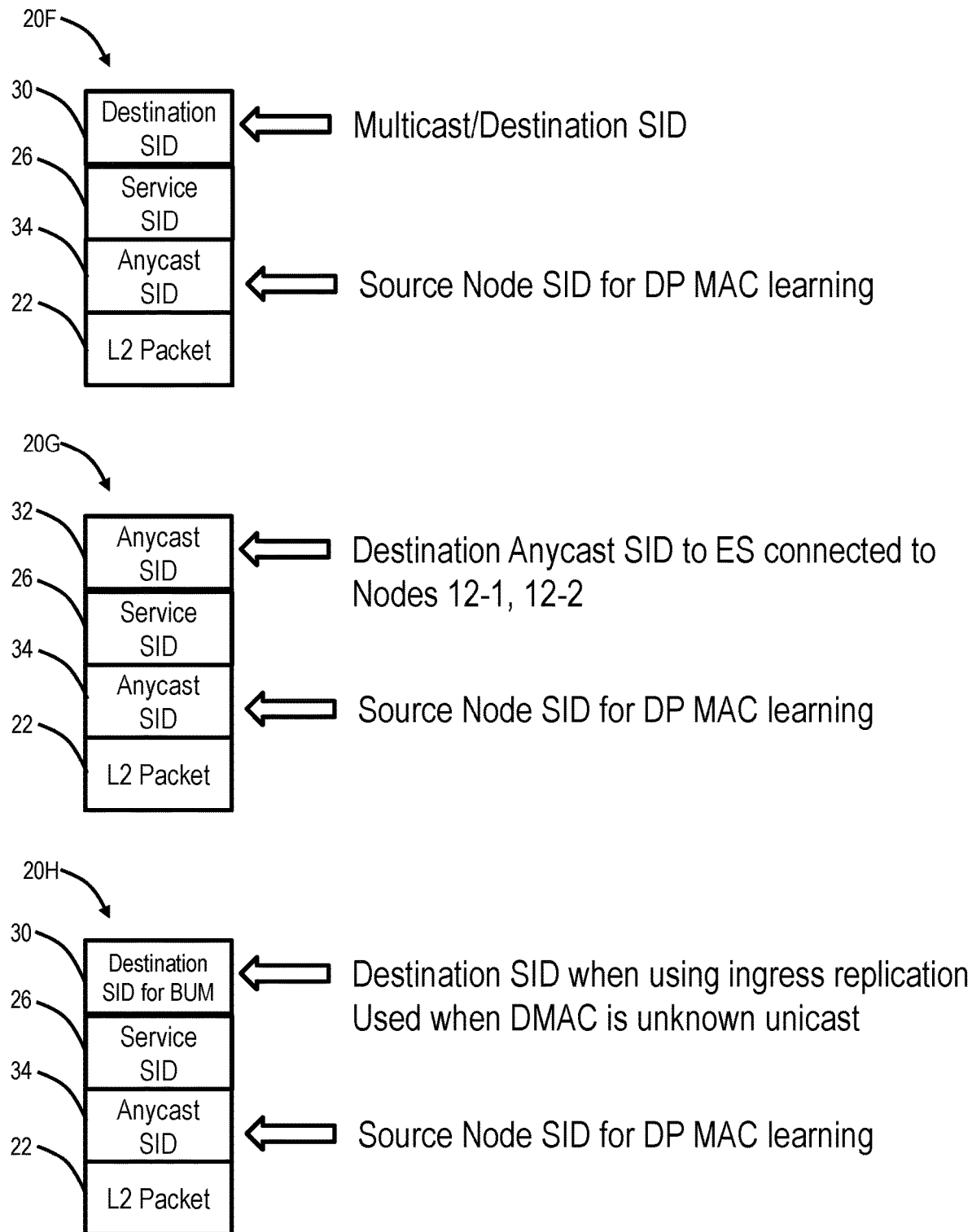
FIG. 7 is a block diagram of example packets for illustrating transmissions in the network of FIG. 6.

FIG. 7 is a block diagram of example packets 20F, 20G, 20H for illustrating transmissions in the network 10 of FIG. 6. The packet 20F is for BUM/known unicast (DMAC in L2 packet) from the CE2 through the node 12-5. The packet 20G is for known unicast (DMAC in L2 packet) from the CE2 from the node 12-5 to the nodes 12-1, 12-2. The packet 20H is for an unknown unicast DMAC in L2 packet from the CE2 through the node 12-5.

SR-EVPN-VPLS Service with Data Plane MAC Learning—ARP Suppression Mechanism

Gleaning ARP packet requests and replies can be used to learn IP/MAC binding for ARP suppression. ARP replies are unicast; however, flooding ARP replies can allow all nodes to learn the MAC/IP bindings for the destinations as well.

SR-EVPN-VPLS Service with Data Plane MAC Learning—Mass Withdrawal

Figure 8:
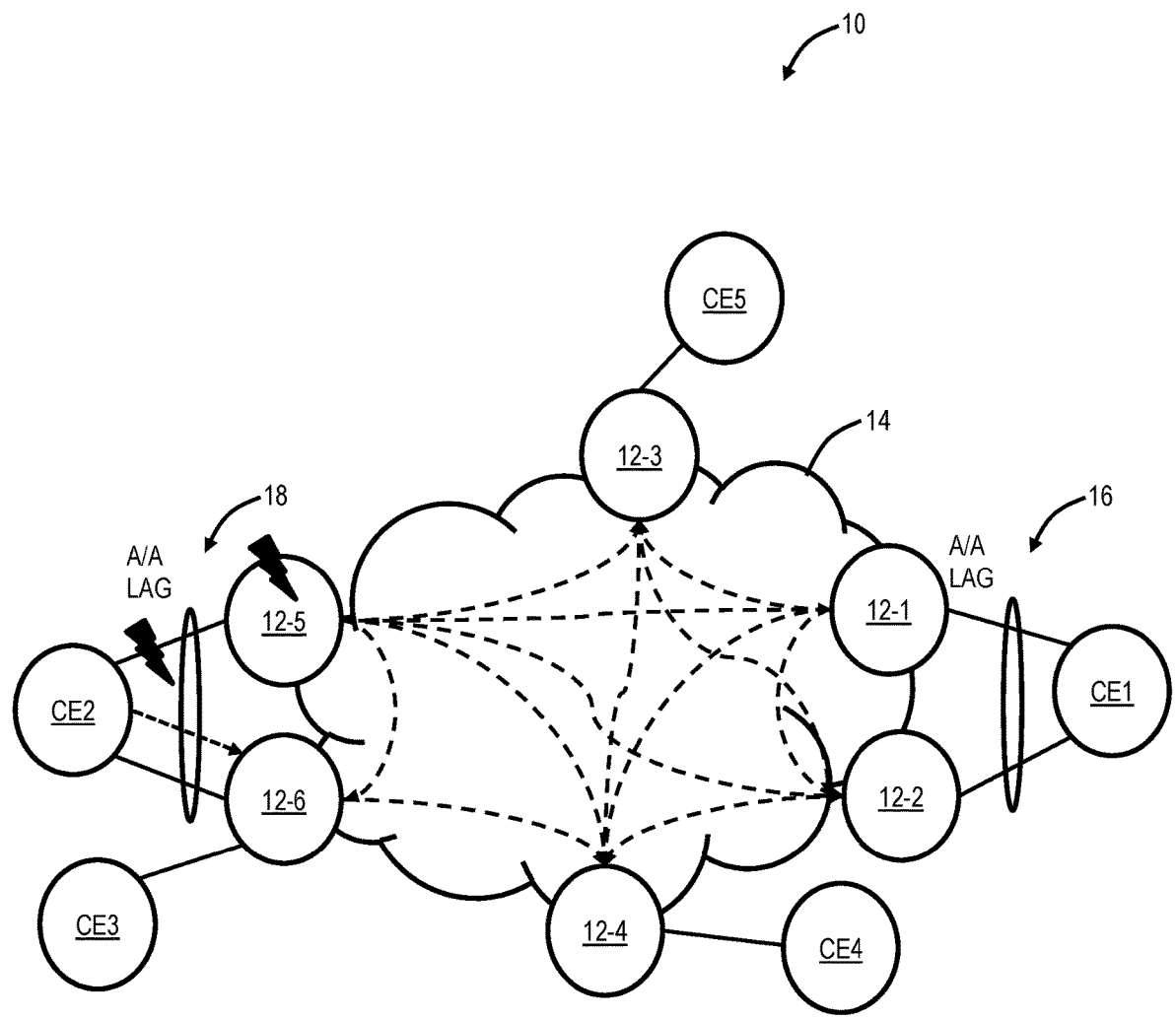
FIG. 8 is a network diagram of the network illustrating mass withdrawal.

FIG. 8 is a network diagram of the network 10 illustrating mass withdrawal. Responsive to a node 12 failure, IGP/BGP will converge, and there is no need to flood any EVPN MASS withdrawal. Responsive to a link failure, the corresponding node 12 can withdraw in IGP/BGP the anycast SID associated with the site, not to receive any packets destined to the MH CE site. For example, in FIG. 8, the node 12-5 can detect a link failure with the CE2 and withdraw in IGP/BGP the anycast SID associated with erthernet segment connected to CE2 and the node 12-5.

SR-EVPN-VPLS Service with Data Plane MAC Learning—Multi-Pathing

Figure 9:
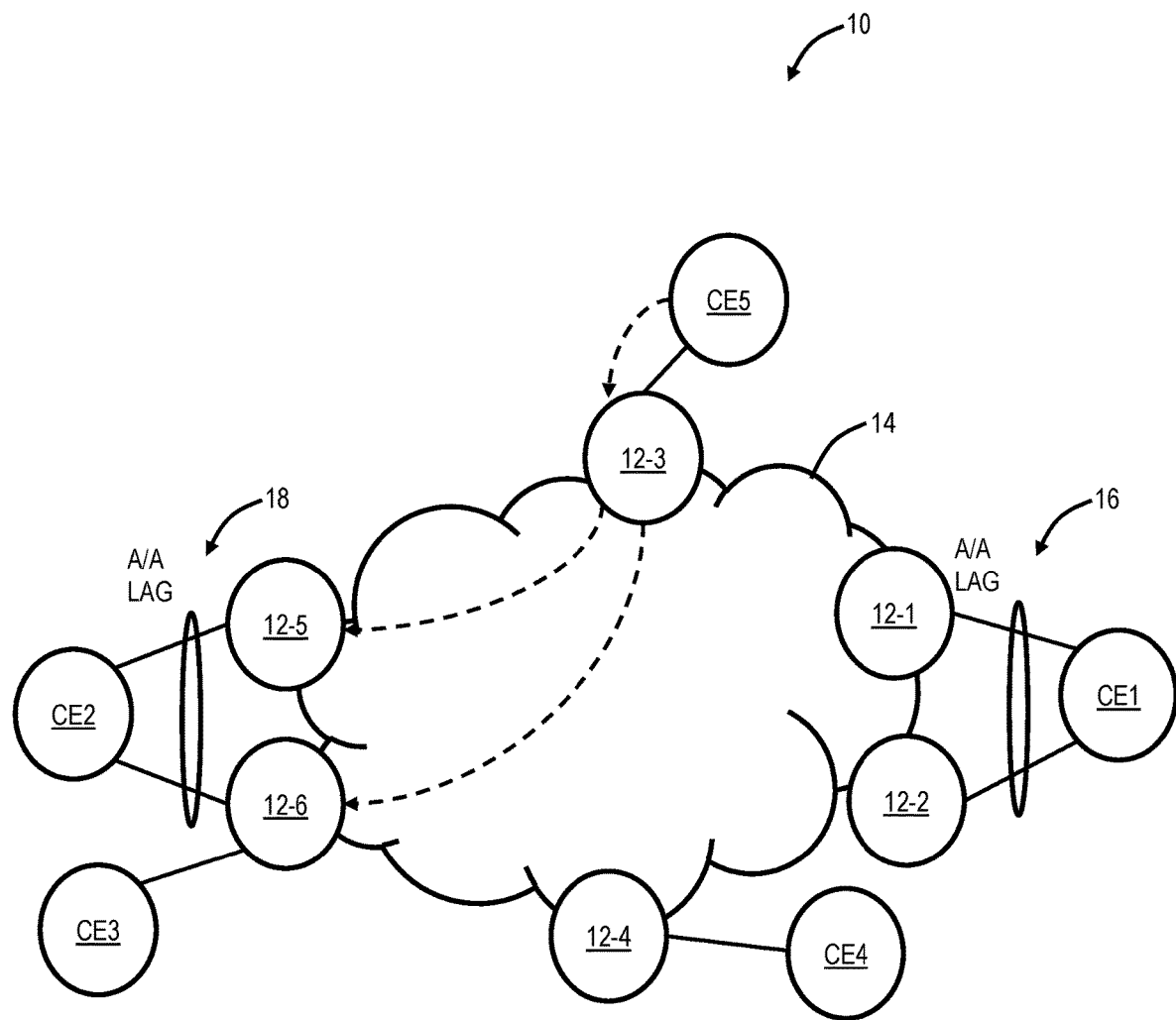
FIG. 9 is a network diagram of the network illustrating multi-pathing.

FIG. 9 is a network diagram of the network 10 illustrating multi-pathing. In this example, a packet from the CE5 through the node 12-3 destined to the MH CE2 connected to the nodes 12-5, 12-6, will utilize ECMP across the Segment Routing network 14 to the nodes 12-5, 12-6, given that it was learned via the anycast SID 32 owned by the nodes 12-5, 12-6. For an example link failure between the node 12-6 and the CE2, the node 12-6 can send the received L2 packet from the Segment Routing network 14 to the node 12-5 or any other of the nodes 12 connected to the MH CE2.

SR-EVPN-VPLS Service with Data Plane MAC Learning—DF Election Mechanisms

DF election mechanisms described in RFC 7432 and various drafts on the DF election are still required but instead used based on received anycast SID advertisement and discovering the other members associated with the MH segment. The DF election describes which node 12 forwards to the CE node in a multi-homing configuration, e.g., the nodes 12-5, 12-6 to the CE2. The present disclosure contemplates existing techniques for such an election, such as RFC 8584, "Framework for Ethernet VPN Designated Forwarder Election Extensibility," April 2019, the contents of which are incorporated by reference herein.

SR-MPLS and SRv6 for SR-EVPN-VPLS Service

As is shown in the various packets 20, the present disclosure generally utilizes a plurality of SIDs 24, 26, 30, 32, 34 for support of data plane MAC learning SR-EVPN-VPLS service. This can include at least three SIDs, namely the destination SID, the service SID, and the source SID. The destination SID 30 defines the destination (node 12) of the packet 20, the service SID 26 identifies the EVI, and the source SID 24, 34 identifies the source (node 12) of the packet 20. As such, any PE node 12 in an EVI can learn the CE MAC address association with PE nodes 12 based on the SID 24, 34.

The present disclosure contemplates use with either SR-MPLS or SRv6. In SR-MPLS, the destination SID, the service SID, and the source SID are MPLS labels. The destination SID can be a node SID or an anycast SID. The service SID can be a new SR endpoint type SID, as long as the nodes 12 can uniquely identify each EVI from the service SID. The source SID can be a node SID or an anycast SID.

For SRv6, there are two options to encode the SID, one as defined in tools.ietf.org/html/draft-ietf-spring-srv6-network-programming-10 and one as defined in tools.ietf.org/html/draft-filsfils-spring-net-pgm-extension-srv6-usid-04, the contents of each are incorporated by reference herein.

Option 1: 128bits SRv6 SID format is LOC:FUNCT:ARG—the destination SID, the service SID, and the source SID can be encoded in the FUNCT part. This option would require the Segment Routing Header (SRH) with a segment list. One option is to encode the source SID in the v6 source address SA, as well the destination SID can be the v6 Destination address DA, and the SRH, in that case, may only have the service SID. New SR endpoint behavior as per tools.ietf.org/html/draft-ietf-spring-srv6-network-programming-10 can be defined to perform the MAC learning. The SRH can include other transport SIDs to reach the destination of the service.

Option 2 128bits SRv6 SID format <uSID-Block><Active-uSID><Next-uSID> . . . <Last-uSID><End-of-Carrier>—uSID is 16 bits. End of Carrier=0. In this case, the destination SID and the service SID can be encoded in the SRv6 DA and the source SID in the v6 source address, i.e., an SRH may not be needed in that case. The SRH may exist and can include other transport uSIDs to reach the destination of the service.

SR-EVPN-VPLS Process

Figure 10:
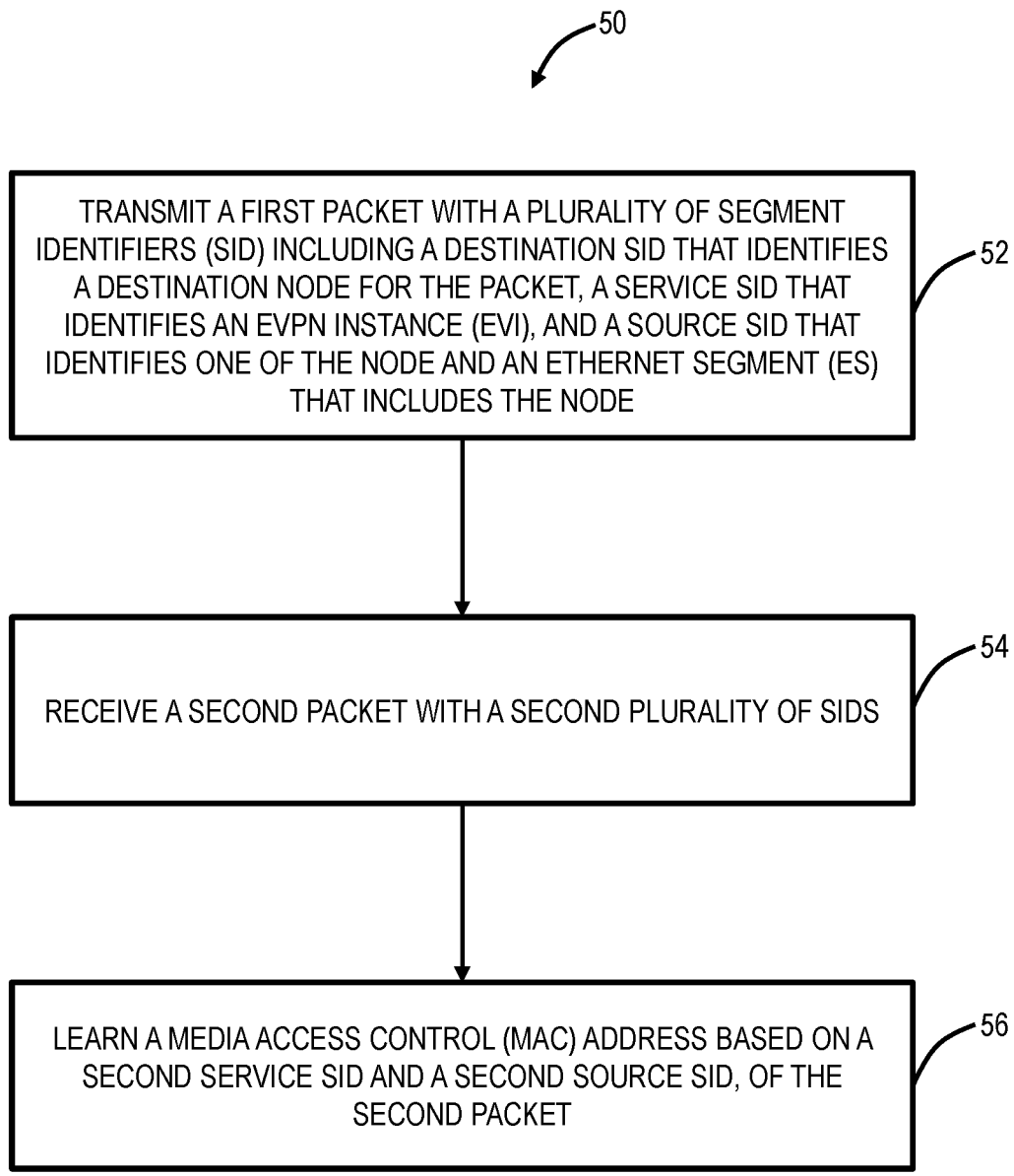
FIG. 10 is a flowchart of a process implemented by a node in a Segment Routing network.
Figure 11:
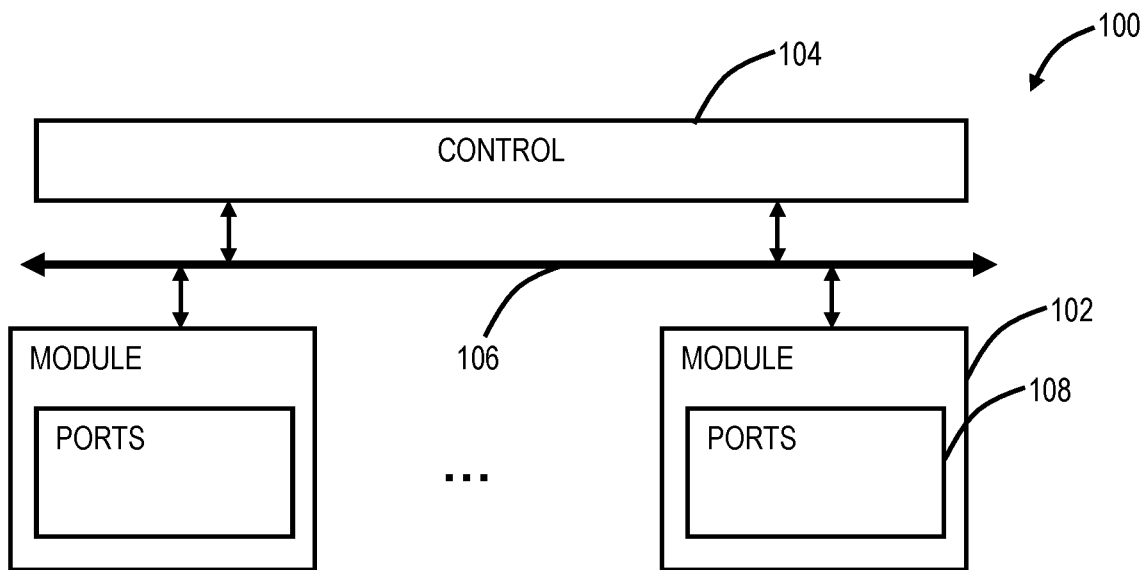
FIG. 11 is a block diagram of an example implementation of a node, such as for the node in the network and the Segment Routing network.

FIG. 10 is a flowchart of a process 50 implemented by a node 12 in a Segment Routing network 14. The node 12 can include a plurality of ports and a switching fabric between the plurality of ports, such as illustrated in FIG. 11. The process 50 is performed to implement data plane MAC learning in an SR-EVPN-VPLS service.

The process 50 includes transmitting a first packet with a plurality of Segment Identifiers (SID) including a destination SID that identifies a destination node for the packet, a service SID that identifies an EVPN Instance (EVI), and a source SID that identifies one of the node and an Ethernet Segment (ES) that includes the node (step 52), receiving a second packet with a second plurality of SIDs (step 54), and learning a Media Access Control (MAC) address based on a second service SID and a second source SID, of the second packet (step 56).

Again, the node 12 utilizes the second plurality of SIDs for data plane-based MAC learning in lieu of control plane learning. The service SID is configured on every node in the Segment Routing network that are a member of the EVI. The service SID is distributed via signaling in the Segment Routing network. The source SID is an anycast SID when the node is in a multi-homed configuration in the ES along with one or more additional nodes of the Segment Routing network. The node and the one or more additional nodes in the Segment Routing network utilize a designated forwarding election to determine which node forwards in the ES.

The destination SID can be a multicast SID for Broadcast, Unknown, and Multicast (BUM) traffic. The source SID is located after the service SID, in the label stack, for the destination node to learn a source Media Access Control (MAC) address in the L2 packet associated with the node (Source SID).

Example Node

FIG. 11 is a block diagram of an example implementation of a node 100, such as for the node 12 in the network 10 and the Segment Routing network 14. Those of ordinary skill in the art will recognize FIG. 11 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, the SR controller 16, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 18 is meant to provide a functional view, and those of ordinary skill in the art will recognize actual hardware implementations may vary.

Example Controller

Figure 12:
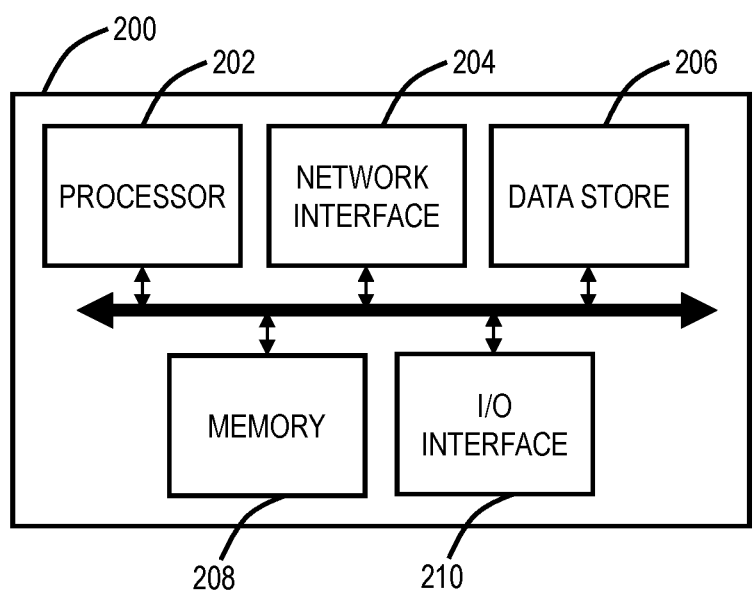
FIG. 12 is a block diagram of an example controller.

FIG. 12 is a block diagram of an example controller 200, which can form a controller for the node 12. The controller 200 can be part of the node 12, or a stand-alone device communicatively coupled to the node 200. Also, the controller 200 can be referred to in implementations as a control module, a shelf controller, a shelf processor, a system controller, etc. The controller 200 can include a processor 202 which is a hardware device for executing software instructions. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 204 can be used to enable the controller 200 to communicate on a data communication network, such as to communicate to a management system, to the nodes 12, 100, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A node comprising:
a plurality of ports and a switching fabric between the plurality of ports,
wherein, for an Ethernet Virtual Private Network (EVPN)-Virtual Private Local Area Network Service (VPLS) that is configured to operate in a Segment Routing network, a port is configured to
transmit a packet with a plurality of Segment Identifiers (SIDs) including a destination SID that identifies a destination node for the packet, a service SID that identifies an EVPN Instance (EVI), and a source SID that identifies one of the node and an Ethernet Segment (ES) that includes the node, wherein each of the plurality of SIDs represent a segment in the Segment Routing network,
receive a second packet with a second plurality of SIDs, and
learn a Media Access Control (MAC) address based on a second service SID and a second source SID, of the second packet,
wherein the plurality of SIDs are utilized to learn information related to one or more of EVPN Route Types 1, 2, and 3, and wherein the node utilizes the second plurality of SIDs for data plane-based MAC learning in lieu of control plane learning.

2. The node of claim 1, wherein the service SID is configured on every node in the Segment Routing network that are a member of the EVI.

3. The node of claim 1, wherein the service SID is distributed via signaling in the Segment Routing network.

4. The node of claim 1, wherein the source SID is an anycast SID when the node is in a multi-homed configuration in the ES along with one or more additional nodes of the Segment Routing network.

5. The node of claim 4, wherein the node and the one or more additional nodes in the Segment Routing network utilize a designated forwarding election to determine which node forwards in the ES.

6. The node of claim 1, wherein the destination SID is a multicast SID or a node broadcast SID for Broadcast, Unknown, and Multicast (BUM) traffic.

7. The node of claim 1, wherein the source SID is located after the service SID for the destination node to learn a source Media Access Control (MAC) address associated with the node.

8. A method comprising:
in a node in a Segment Routing network with the node including a plurality of ports and a switching fabric between the plurality of ports, and for an Ethernet Virtual Private Network (EVPN)-Virtual Private Local Area Network Service (VPLS); and
transmitting, by a port, a packet with a plurality of Segment Identifiers (SIDs) including a destination SID that identifies a destination node for the packet, a service SID that identifies an EVPN Instance (EVI), and a source SID that identifies one of the node and an Ethernet Segment (ES) that includes the node, wherein each of the plurality of SIDs represent a segment in the Segment Routing network,
receiving, by the port, a second packet with a second plurality of SIDs; and
learning a Media Access Control (MAC) address based on a second service SID and a second source SID, of the second packet,
wherein the plurality of SIDs are utilized to learn information related to one or more of EVPN Route Types 1, 2, and 3, and wherein the node utilizes the second plurality of SIDs for data plane-based MAC learning in lieu of control plane learning.

9. The method of claim 8, wherein the service SID is configured on every node in the Segment Routing network that are a member of the EVI.

10. The method of claim 8, wherein the service SID is distributed via signaling in the Segment Routing network.

11. The method of claim 8, wherein the source SID is an anycast SID when the node is in a multi-homed configuration in the ES along with one or more additional nodes of the Segment Routing network.

12. The method of claim 8, wherein the destination SID is a multicast SID or a node broadcast SID for Broadcast, Unknown, and Multicast (BUM) traffic.

13. The method of claim 8, wherein the source SID is located after the service SID for the destination node to learn a source Media Access Control (MAC) address associated with the node.

14. An apparatus, in a node in a Segment Routing network, for implementing an Ethernet Virtual Private Network (EVPN)-Virtual Private Local Area Network Service (VPLS), the apparatus comprising:
- circuitry configured to transmit a first packet with a plurality of Segment Identifiers (SIDs) including a destination SID that identifies a destination node for the packet, a service SID that identifies an EVPN Instance (EVI) in the Segment Routing network, and a source SID that identifies one of the node and an Ethernet Segment (ES) that includes the node, wherein each of the plurality of SIDs represent a segment in the Segment Routing network,
- circuitry configured to receive a second packet with a second plurality of SIDs, and
- circuitry configured to learn a Media Access Control (MAC) address based on a second service SID and a second source SID, of the second packet,
- wherein the plurality of SIDs are utilized to learn information related to one or more of EVPN Route Types 1, 2, and 3, and wherein the second plurality of SIDs are used for data plane-based MAC learning in lieu of control plane learning.

15. The apparatus of claim 14, wherein the source SID is an anycast SID when the node is in a multi-homed configuration in the ES along with one or more additional nodes of the Segment Routing network.

* * * * *